United States Patent [19]

Oscarsson et al.

[11] Patent Number: 5,942,463
[45] Date of Patent: Aug. 24, 1999

[54] ALKALI RESISTANT PROTEIN ADSORBENT

[76] Inventors: Sven Oscarsson, Dalgatan 7B, S-752 28 Uppsala; Jerker Porath, Bodalsväg 4, S-181 36 Lidingö, both of Sweden

[21] Appl. No.: 08/750,082
[22] PCT Filed: Jun. 6, 1995
[86] PCT No.: PCT/SE95/00656
§ 371 Date: Dec. 19, 1996
§ 102(e) Date: Dec. 19, 1996
[87] PCT Pub. No.: WO95/33557
PCT Pub. Date: Dec. 14, 1995

[30] Foreign Application Priority Data

Jun. 7, 1994 [SE] Sweden .................................. 9401960

[51] Int. Cl.[6] ..................................................... B01J 20/26
[52] U.S. Cl. ......................................... 502/402; 210/502.1
[58] Field of Search .................................... 210/656, 660, 210/690, 691, 692, 502.1, 506; 502/401, 402, 404, 405; 530/412, 413, 515

[56] References Cited

U.S. PATENT DOCUMENTS 4,696,980   9/1987   Porath ..................................... 530/415
5,502,022   3/1996   Schwarz et al. ......................... 530/412

FOREIGN PATENT DOCUMENTS 0 168 363   1/1986   European Pat. Off. .
0 180 563   5/1986   European Pat. Off. .
0 245 222   11/1987  European Pat. Off. .
462 165     5/1990   Sweden .
WO 92/16292 10/1992  WIPO .

*Primary Examiner*—Ivars Cintins
*Attorney, Agent, or Firm*—Young & Thompson

[57] ABSTRACT

An adsorbent preferably for proteins and peptides, but also for e.g. certain metals, with hydrophilic ligands covalently bonded to a polymer net around a carrier, and having the general structure: $—X—S—(CH_2)_n—R$, wherein X is a spacer arm, n is an integer 1 or 2, and R is a π-electron-rich ring system with at least one nitrogen atom in the ring structure. Thanks to its resistance to 1M caustic, a concentration which eliminates bacteria, viruses and pyrogens, the adsorbent can be reused for medical purposes in large scale work.

13 Claims, No Drawings

ALKALI RESISTANT PROTEIN ADSORBENT

FIELD OF THE INVENTION

The invention relates to an adsorbent for the separation and immobilization of proteins, comprising a carrier material with covalently bound ligands, and a method of manufacturing the adsorbent and the use thereof. More specifically, the adsorbent is alkali resistant, and thereby suitable for the use together with proteins which, during certain treatment steps, can be subjected to alkaline solutions.

At the chromatographic process the adsorption of proteins increases through the addition of different types of salts in different salt concentrations, and after the removal of salt from the eluation buffer the proteins will desorb from the adsorbent, and can be purified in this way or be divided into different fractions.

BACKGROUND OF THE INVENTION

At present, for the purification of proteins adsorbents with ligands giving large protein losses at the eluation of the protein are used.

Even after washing of the adsorbent with 1M caustic solution, protein remains on the adsorbent and alters its characteristics. Re-use thereof may thus cause risks of contamination of further test mixtures with the proteins that remain on the adsorbent. As an alternative to these adsorbents more specific adsorbents have been developed for the isolation of a.o. IgG. These adsorbents are characterized by that a protein is covalently bound to the adsorbent and binds specifically to IgG. The disadvantages are that the covalently bound protein is released and leaks out and can cause medical complications thereby.

As an alternative to such biospecific adsorbents (Protein A and Protein G, resp.) so called tiophilic adsorbents have been developed (Porath, Belew—SE-PS 8405431-1). The tiophilic adsorbents of the kind having been developed hitherto, however, are not alkali stable, wherefore purification and washing with 1M caustic solution can not be performed without risk of the undesirable effect, which is a condition for preventing bacterial and virus infections and risk for pyrogens, when the adsorbent is re-used in large scale processes.

An adsorbent with the structure

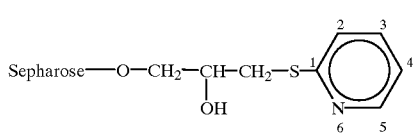

I is previously described in EP-A-0 180 563 and SE-B-462 165 (Porath and Oscarsson). The disadvantage with this adsorbent is that it is not alkali stable, because of the unfavourable electron density distribution within the molecule, which is determined by the positions therein of the sulphur and nitrogen, respectively.

The electron density distribution within the pyridyl sulphide molecule in formula I is shown in formula II below

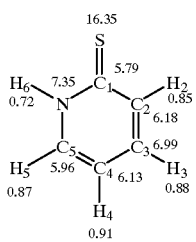

II

When the electron density distribution within the molecule is calculated carbon atom $C_1$ is shown to have an electron deficit in its position, which means that the nucleophilic hydroxyl group can react at position $C_1$ and result in elimination of hydroxipyridin. If the sulphur is moved from the pyridine ring within the above describe molecule by the introduction of a methylene group between the sulphur and the pyridine ring the undesired effect of an electron deficit on $C_1$ does not occur. This has also been verified experimentally. The adsorbent will thereby remain stable against alkali, and has a high desorption effectivity towards proteins having been into contact with the adsorbent, and further very low protein residues.

SUMMARY OF THE INVENTION

The object of the invention is now to provide an adsorbent which can be subjected to 1M alkali during a prolonged time without being broken down, and thereby can be effectively cleaned of bacteria, viruses and pyrogens.

A further object of the invention is to provide an adsorbent which can be eluated without noticeable losses.

Further, the invention aims at providing an adsorbent which can be re-used after eluation with 1M caustic solution, without causing a risk of passing on infection.

The adsorbent according to the invention consist of a carrier material comprised of a solid phase, completely or partially penetrated by or surface-coated with a hydrophilic polymeric network in the form of finely divided particles with a diameter less than 1 mm or diaphragms with a thickness not exceeding 1 mm. The solid phase to which the hydrophilic polymer component has been bonded, included or surface-coated, may comprise an inorganic constituent such as silica or a derivative, or a hydrophobic organinic polymer such as polystyrene.

The polymeric network is comprised of a hydrophilic polymer such as a polyhydroxy polymer, e.g. preferably a polygalactane such as agar or agarose, cross-linked cellulose or agarose, a cross-linked polyhydric polymer such as polyvinyl alcohol, or can also be a cross-linked polyacryl amide. To the polymeric network ligands with the general structure

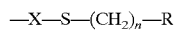

are covalently bonded, and in which X is a spacer arm, n is an integer 1 or 2, and R is a π-electron-rich ring system with at least one nitrogen atom in the ring structure such as a nitro or cyano group. For example R is comprised of

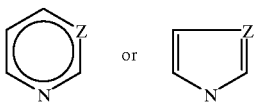

wherein Z is N or CH. The ligand preferably comprises a picolyl thioether group.

The adsorbent according to the present invention show particular adsorption features, which are shown especially in contacts with protein solutions, especially in the presence of high concentrations of lyotropic salts, such as sulfate and phosphate of alkali metals, magnesium and ammonium, where the proteins are distinguished in classes having different adsorptive strength depending on their preferential affinity proportion to the adsorbent. The adsorbent according to the invention can also be used for the adsorption of certain soft metal ions such as $Ag^+$, $Hg^{2+}$, $Pd^{2+}$ and $Pt^{2+}$.

DETAILED DESCRIPTION OF THE INVENTION

The invention will now be described more in detail below together with examples of the manufacture of the adsorbent.

EXAMPLE 1

Pyridyl-2-methyl thioether agarose.

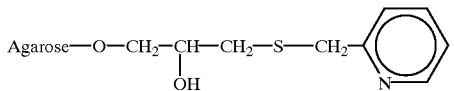

Firstly, an epoxy active gel is manufactured by further washing 50 g washed, 6% agarose gel (Sepharose 6B) with distilled water and thereafter adding 0.34 g $NaBH_4$ and 35 ml 2M NaOH and drop by drop 25 ml epichlorohydrin. The reaction is then continued for about 20 hours at room temperature.

To 50 g of this gel is added 10 ml 2M $Na_2S_2O_3$ and the reaction is allowed to continue for 10 hours at room temperature.

Activation is performed adding 1.5 g dithioerythritol (DTT) in 100 ml 0.1M $NaHCO_3$ to 25 g gel and reacting for 30 minutes at room temperature.

The activated gel is washed on a glass filter with distilled water, whereupon 2.5 g picolylchloride (2-chloro-methyl-pyridine) in 0.1M $NaHCO_3$ is added, and pH is adjusted to 8.0. The reaction is performed at room temperature for 3 hours. Stability studies of the gel is made by elementary analysis of the nitrogen content before and after keeping the gel in 1M NaOH at 40° C. for 13 days.

TABLE

| | % by weight of nitrogen |
| --- | --- |
| Testing of new gel according to the invention | 1.4 |
| After 13 days and nights in 40° C. caustic | 1.3 |
| Comparative testing of gel with sulphur directly bonded to the pyridine nucleus | 1.4 |
| After washing of comparative specimen with cold caustic | 0.5 |

The gel according to the invention can thus be washed with 1M caustic with any risk of degradation while previously used gels for purification of e.g. IgG are destroyed already when washing with 1M caustic at room temperature.

Purification (fractionation) of IgG with a gel according to the invention before and after washing did not show any significant changes regarding capacity and specificity.

In re-use of the gel for fractionation of IgG no difference could be noticed.

Correspondingly good results were obtained also with, among others, gels with the following ligands

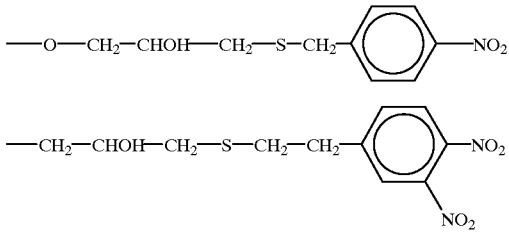

EXAMPLE 2

Pyridyl-4-methyl thioether agarose

In the same way as in Example 1 pyridyl-4-methyl thioether agarose is manufactured but instead of 2-picolylchloride the same amount of 4-picolylchloride (4-chloro methyl pyridine) is used.

EXAMPLE 3

Quinoline-2-methyl thioether silica.

In a round flask 100 ml dried toluene and 24 g silica are added, then 3 ml dried triethylamine is added followed by 30 ml g-glycidoxypropyl-trimethoxysilane. The mixture is refluxed for 3 hours and is thereafter washed on a glass filter with toluene and activated with 10 ml 2M $Na_2S_2O_3$ for 10 hours at room temperature. To the washed gel 1 g dithioerythritol dissolved in 0.1M $NaHCO_3$ is added, and pH is adjusted to 7.5. After 30 minutes reaction the gel is washed on a glass filter with distilled water followed by toluene. 2 g quinoline-2-methylchloride dissolved in toluene is added to the toluene-washed silicate gel and is allowed to react for 6 hours at 60° C., whereafter the gel is washed with toluene on a glass filter.

EXAMPLE 4

Imidazolylethyl thioether agarose.

Manufacture in the same way as in Example 1, with the exception that instead of 2-picolylchloride the same amount of vinylimidazol is used.

EXAMPLE 5

Uracilyl-6-methyl thioether agarose.

Manufacture in the same way as in Example 1 with the exception that instead of 2-picolylchloride, 6-chloromethyluracil is used.

Use of the Gel According to the Invention

In the chromatographic process the adsorption of the protein is amplified by the addition of different types of salts to different salt concentrations. When the salt is removed from the eluation buffer the proteins are desorbed.

Under optimal conditions the adsorbent according to the invention has shown a retainment of 2.7% of the totally applied protein after desorption with a buffer free from salt.

The corresponding commercial preparation, octyl-Sepharose and phenyl-Sepharose showed under optimal conditions a retainment of 29.3 and 8.1% by weight, respectively, of the totally applied protein after desorption with a buffer free from salt. Since every percent retained protein is a correspondingly large loss every reduction of the retainment is of great economic importance.

As noted above both retained protein and adsorbent may carry infections, e.g. viruses, bacteria, pyrogens, but these are effectively rendered harmless by washing with 1M caustic. The total amount of remaining protein on the adsorbent after washing with 1M soda-caustic has been determined with aminoacid analysis and has been compared with the values of the presently used adsorbents after a considerably milder treatment, i.e. not sufficient for a safe reuse. As is evident from the table the nitrogen value was kept at 1.4% by weight on the adsorbent according to the invention upon treatment for 13 days and nights at 40° C., while the nitrogen value already after a washing with short duration with cold caustic was reduced from 1.4 to 0.5% by weight for pyridine thioether adsorbent where sulphur is directly bonded to the pyridine nucleus.

The reason for the enhanced characteristics of the gel according to the invention is assumed to depend on the effect of the nitrogen atom and the sulphur on the electron distribution within the ligand. With an unfavourable placement of these within the ligand, electron deficit especially on the carbon atoms will make possible nucleophilic attack of the hydroxyl groups (from the alkali solution) on those carbon atoms having an electron deficit, which means a destabilization of the ligand. Investigations of the electron distribution have been made on the adsorbent according to the invention and on corresponding, presently used, commercial preparations, and confirm this assumption.

We claim:

1. An adsorbent for the separation and immobilization of biopolymers selected from the group consisting of proteins, peptides, and nucleic acids, said adsorbent being resistant to aqueous alkali and comprising a carrier material with covalently bonded ligands, the carrier material being comprised of a solid phase which is completely or partially penetrated or surface-coated with a hydrophilic polymeric network, and the ligands having the structure

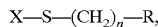

wherein X is a spacer arm, n is 1 or 2, and R is a π-electron-rich ring system with at least one nitrogen atom in the ring structure, whereby the introduction of at least one $CH_2$-group between the S-atom and the bonded C-atom in the ring system eliminates an alkali sensitive electron deficit in the binding position of the C-atom.

2. The adsorbent according to claim 1, wherein the solid phase is comprised of particles with a diameter less than 1 mm or of a diaphragm with a thickness not exceeding 1 mm.

3. The adsorbent according to claim 1, wherein the polymer network is a polyhydroxy polymer.

4. The adsorbent according to claim 3, wherein the polyhydroxy polymer is a polygalactane.

5. The adsorbent according to claim 4, wherein the polyhydroxy polymer is agar or agarose.

6. The adsorbent according to claim 1, wherein the polymer network is comprised of a polyamide.

7. The adsorbent according to claim 1, wherein the solid phase is comprised of silica to which the hydrophilic polymer component has been bonded, included or surface-coated.

8. The adsorbent according to claim 1, wherein the solid phase is comprised of a hydrophobic, organic polymer to which the hydrophilic polymer component has been bonded, included or surface-coated.

9. The adsorbent according to claim 8, wherein the hydrophobic, organic polymer is polystyrene.

10. The adsorbent according to claim 1, wherein R is comprised of

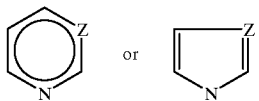

and wherein Z is N or CH.

11. The adsorbent according to claim 1, wherein the ligand comprises a picolyl thioether group.

12. The adsorbent according to claim 1, wherein the spacer arm contains the structure —$CH_2$—CHOH—$CH_2$—.

13. The adsorbent according to claim 1, wherein the adsorbent is alkali stable against 1M NaOH at 40° C. for at least 13 days.

* * * * *